United States Patent [19]

Carsten et al.

[11] 4,456,986

[45] Jun. 26, 1984

[54] APPARATUS FOR COUPLING SIGNALS TO OR FROM A TWO-WIRE LINE

[75] Inventors: Ralph T. Carsten, Nepean; Michael S. Nakhla, Ottawa; Charles B. D. Bunner, Carp, all of Canada

[73] Assignee: Northern Telecom Limited, Montreal, Canada

[21] Appl. No.: 333,666

[22] Filed: Dec. 23, 1981

[51] Int. Cl.³ .............................................. H04B 1/50
[52] U.S. Cl. .................................. 370/30; 370/123; 179/2 DP; 333/131
[58] Field of Search ............... 179/2 DP, 170 D; 370/30, 76, 69.1, 123; 333/119, 131, 100, 4, 5

[56] References Cited

U.S. PATENT DOCUMENTS 4,368,361  1/1983  Chung et al. ............... 179/170 D
4,378,470  3/1983  Murto et al. ............... 179/2 DP Primary Examiner—Douglas W. Olms
Assistant Examiner—Kenneth I. Rokoff
Attorney, Agent, or Firm—R. John Haley

[57] ABSTRACT

Voice-band signals are coupled to and from a telephone subscriber line via a low-pass filter which has a shunt capacitor coupled across the line. In order to simultaneously couple above voice-band signals to and from the line, this capacitor is coupled to the line via windings of a transformer. The above voice-band signals are coupled via the transformer to and from the line, for example via series inductors which are series resonant with the filter capacitor, as reflected through the transformer, at above voice-band signal frequencies. A parallel resonant circuit, which has a low impedance in the voice-band, is connected in parallel with a winding of the transformer to prevent degradation of the filter characteristics in the voice-band.

8 Claims, 5 Drawing Figures

APPARATUS FOR COUPLING SIGNALS TO OR FROM A TWO-WIRE LINE

This invention relates to apparatus for coupling signals to or from a two-wire line. The invention is particularly, but not exclusively, concerned with apparatus for separately coupling both voice-band signals and above voice-band data signals in both directions to and from a balanced two-wire line such as a telephone subscriber line.

Reference is directed to our U.S. patent application Ser. No. 333,664 filed simultaneously herewith entitled "Apparatus for Coupling Signals to or from a Two-Wire Line", the entire disclosure of which is hereby incorporated herein by reference.

Reference is also directed to U.S. patent application Ser. No. 333,665 filed simultaneously herewith by M. S. Nakhla entitled "Filters Comprising Reactive Components and a Method of Determining Impedances Thereof", the entire disclosure of which is hereby incorporated herein by reference.

The above-mentioned application by M. S. Nakhla describes a filtering arrangement which can satisfy particular design characteristics when terminated with various impedances. The filtering arrangement is exemplified by a low pass filter for coupling voice-band signals to and from arbitrary telephone subscriber lines of widely variable and complex impedance without resorting to buffering or adaptive arrangements. Such a filter is particularly useful for coupling voice-band signals on such lines to telephone equipment, without also coupling to such equipment above voice-band data signals which can be carried on the lines.

The above-voice-band signals, for example data signals, must also be coupled to and from the two-wire line. To this end, a coupling network is needed which does not adversely affect the designed filter characteristics, couples the data signals to and from the two-wire line in a balanced manner, and avoids the data signals being attenuated by the filter components. In the former respect in particular the above filter provides a small attenuation ripple in the filter pass band, which should not be degraded by the presence of the data signal coupling network.

Accordingly, an object of this invention is to provide apparatus which facilitates coupling signals in a predetermined pass band of a filter, and signals having frequencies outside said pass band, to or from a two-wire line.

According to this invention there is provided apparatus comprising: a transformer having at least one first winding and at least one second winding; a filter having a predetermined pass band for coupling signals in the pass band to or from a two-wire line, the filter including a shunt capacitor coupled in series with the at least one second winding across the two-wire line; and means, coupled in parallel with the at least one first winding, having a relatively low impedance at frequencies in the pass band and a relatively high impedance at frequencies outside the pass band of the filter; whereby signals at said frequencies outside the pass band of the filter can be coupled to or from the two-wire line via the transformer.

In preferred embodiments the transformer comprises two second windings connected in series with the capacitor, one on each side thereof, across the two-wire line.

The means coupled in parallel with the at least one first winding preferably comprises a parallel resonant circuit which is resonant at a frequency outside the pass band of the filter.

In particular, the filter may be a low pass filter and the two-wire line may comprise a telephone subscriber line.

The invention will be further understood from the following description with reference to the accompanying drawings, in which.

Figure 1:
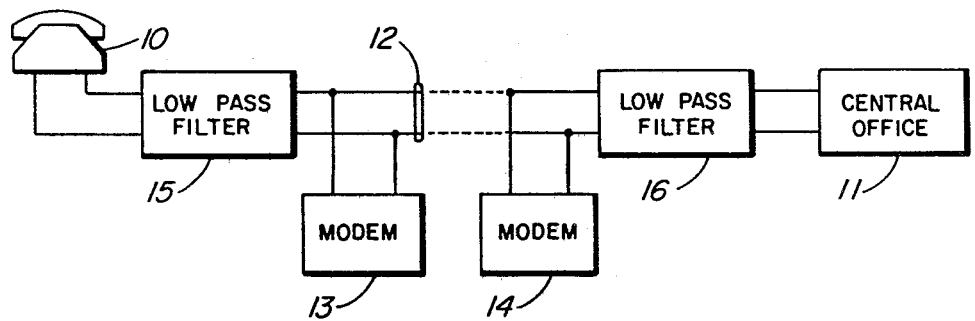
FIG. 1 illustrates in a block diagram a telephone subscriber line including at each end of the line a low pass filter for separating voice frequency signals from higher frequency data signals on the line.

Referring to FIG. 1, a subscriber's telephone 10 is coupled to a telephone central office 11 via a conventional two-wire subscriber line 12. Modems 13 and 14 are also connected, via coupling networks which are not shown in FIG. 1, to the subscriber line 12 for transmitting data via the subscriber line between the locations of the telephone 10 and the central office 11 at above voice-band frequencies. In order to prevent the data from passing to the telephone 10 and to the central office 11, these are coupled to the subscriber line 12 via low pass filters 15 and 16.

Figure 2:
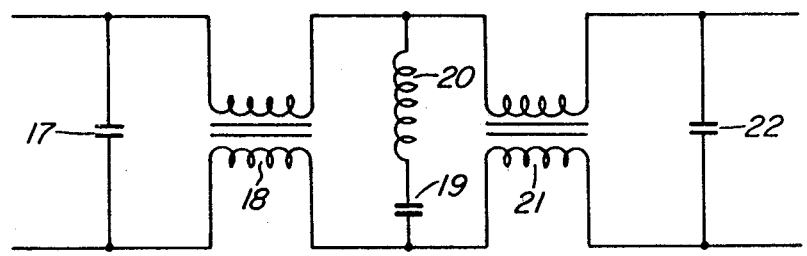
FIG. 2 illustrates a balanced form of each low pass filter.

As described in the application by M. S. Nakhla already referred to, each low pass filter 15, 16 is preferably a 5th order filter as shown in FIG. 2, comprising a shunt capacitor 17, a series inductor 18 which is divided equally between the two wires of the filter and is constituted by two coupled coils to provide small size and good longitudinal balance, a shunt capacitor 19 in series with an inductor 20, a series inductor 21 similar to the inductor 18, and a shunt capacitor 22. For the filter to have a characteristic including a pass band up to a frequency of 3200 Hz in which the filter has a maximum attenuation ripple of ±0.1 dB relative to the attenuation at 1000 Hz, and a stop band above a frequency of 21 kHz in which the filter has a minimum attenuation of 60 dB, the components 17 to 22 have values of 30.88nF, 24.96mH, 80.54nF, 0.399mH, 24.96mH, and 30.88nF respectively. Each series inductor 18 and 21 is conveniently formed by two bifilar wound coils coupled as indicated in FIG. 2, the inductance of each individual coil, measured with the coil to which it is coupled open-circuit, being 6.24mH.

As shown in FIG. 2 the shunt capacitor, for example 22, at the line 12 side of the low pass filter provides a low impedance across the line 12 for above voice-band signals. Consequently a problem arises in transmitting such signals between the modems 13 and 14 via the line 12 without excessive attenuation or loss of the signals due to the shunt capacitors of the filters. Furthermore, it is necessary to couple the modems 13 and 14 to the line 12 in such a manner that the design characteristics of the filters 15 and 16 are still complied with. This presents a significant problem in particular in maintaining the desired small attenuation ripple in the filter pass band.

Furthermore, it is desirable to provide for full duplex transmission of signals between the modems 13 and 14, simultaneously with the transmission of voice signals on the line 12. For example, the signals transmitted from the modem 13 to the modem 14 may be FSK data signals at a center frequency of 36kHz and having actual frequencies of 35.5 and 36.5 kHz, and the signals transmitted from the modem 14 to the modem 13 may be FSK data signals at a center frequency of 22 kHz and having actual frequencies of 21.5 and 22.5 kHz. These signal frequencies are assumed to be used in the following description, but other frequencies and types of signal transmission may be used.

In addition, the line 12 is generally a balanced line, and it is therefore generally desired to couple the data signals between the line and the modems in a balanced manner.

Figure 3:
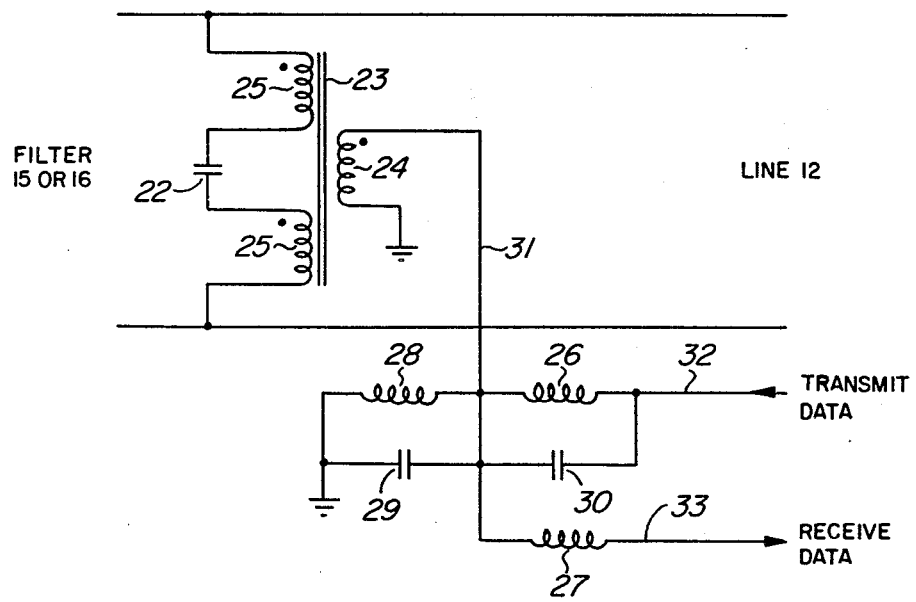
FIG. 3 shows appartus illustrating the principles of embodiments of the invention.

FIG. 3 shows apparatus which illustrates how in accordance with embodiments of the invention the various desiderata above can be met. FIG. 3 shows only the shunt capacitor 22 of the filter 15 or 16 at the line 12 side of the respective filter, the remainder of the filter being as illustrated in FIG. 2. In addition, FIG. 3 shows a data coupling network comprising a transformer 23 having a first winding 24 and two second windings 25 phased as shown by dots, inductors 26, 27, and 28, and capacitors 29 and 30. The second windings 25 of the transformer 23 are coupled in series with the filter capacitor 22, one on each side thereof, across the line 12, to provide a balanced coupling of data signals to and from the line 12. The first winding 24 of the transformer is connected between a wire 31 and circuit ground. With the wire 31 connected as described below, the transformer has a relatively small inductive reactance in the voice-band compared with the capacitive reactance of the capacitor 22, but the actual magnitude of this reactance is not critical because the low pass filter is designed to be insensitive to its terminations. The inductance of the transformer 23, measured across the first winding 24 with the capacitor 22 shorted and the second windings 25 open circuit, is relatively large (for example 8 to 10 times the inductance of the inductor 26) to avoid affecting the resonance described below of the inductor 26 with the capacitor 22.

Transmit data at the respective transmit frequency and present on a wire 32 is coupled to the wire 31 via the inductor 26. The inductance of the inductor 26 is selected so that it is series resonant with the filter capacitor 22, as reflected through the transformer 23, at the transmit frequency. Thus the effect on the transmit data of the shunt capacitor 22 of the low pass filter is compensated by the inductor 26. Similarly the inductance of the inductor 27, which couples receive data from the wire 31 to a wire 33, is selected so that this inductor 27 is series resonant with the filter capacitor 22, as reflected through the transformer 23, at the respective receive frequency. Thus the effect on the receive data of the shunt capacitor 22 is compensated by the inductor 27. The series inductors 26 and 27 therefore facilitate efficient coupling of transmit and receive data between the wires 32 and 33 and the line 12.

In order to inhibit any component at the receive frequency in the transmit data from reaching the line 31, the capacitor 30 is connected in parallel with the inductor 26 to form therewith a parallel resonant circuit which is resonant at the receive frequency.

The inductor 28 and the capacitor 29 are also connected in parallel to form a parallel resonant circuit which is connected between the wire 31 and circuit ground. The values of the components 28 and 29 are selected so that this circuit is resonant at the respective transmit frequency, so that this resonant circuit presents an open circuit to, and does not attenuate, the transmit data on the line 31. At voice frequencies this resonant circuit has a low impedance so that it is a virtual short circuit across the first winding 24 of the transformer 23. Consequently in the filter pass band the second windings 25 of the transformer are virtual short circuits, so that the capacitor 22 is effectively connected directly across the line 12 as in FIG. 2 and the pass band characteristics of the low pass filter are not degraded. In addition, the parallel resonant circuit reduces the effects of impulse noise, for example due to dial pulsing, on circuits connected to the wires 32 and 33, because of its virtual short circuit at voice frequencies where most of the energy of such noise is concentrated.

The parallel resonant circuit comprising the components 28 and 29 provides some attenuation of receive data at the receive frequency but this is readily compensated for by amplification of the receive data signals. This attenuation can be avoided by providing in place of the components 28 and 29 a more complicated circuit which is parallel resonant at both the receive and transmit frequencies, and has a low impedance in the voice-band.

Figure 4:
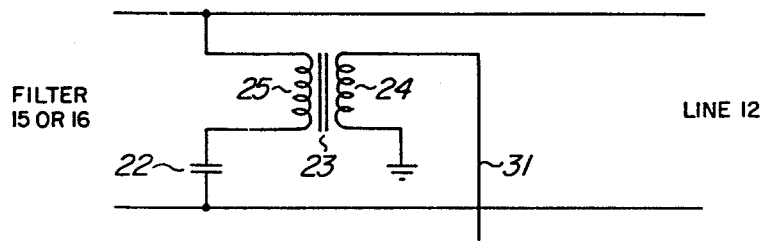
FIG. 4 illustrates an alternative transformer coupling arrangement to that shown in FIG. 3, the alternative arrangement being suitable for coupling signals to and from an unbalanced two-wire line.

FIG. 4 illustrates an alternative arrangement to that of FIG. 3, showing only the filter capacitor 22 and the transformer 23 and their connections, which can be used to couple data signals to and from an unbalanced line 12. The remainder of the coupling network in this case can be as illustrated in FIG. 3. In FIG. 4, the transformer 23 simply has, in addition to the first winding 24 connected between the wire 31 and circuit ground, a single second winding 25 connected in series with the capacitor 22 across the line 12. This arrangement could also be used, if desired, for coupling data signals to and from a balanced line 12, but the arrangement of FIG. 3 is preferred.

Figure 5:
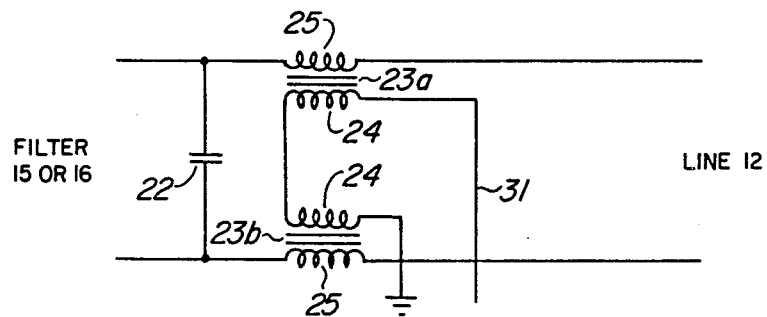
FIG. 5 illustrates another alternative transformer coupling arrangement, for coupling signals to and from a balanced two wire line.

FIG. 5 illustrates another alternative arrangement to that of FIG. 3, again showing only the filter capacitor 22 and the transformer 23 and their connections, which can be used to couple data signals to and from a balanced line 12. Again, the remainder of the coupling network can be as illustrated in FIG. 3. In FIG. 5, the transformer 23 is divided into two parts 23a and 23b, each of which has a first winding 24 and a second winding 25. The first windings 24 are connected in series between the wire 31 and circuit ground. The second windings 25 are connected each in series with a respective wire of the line 12, whereby the filter capacitor 22 is again connected across the line 12 via these windings 25. With appropriately phased second windings connected as shown in FIG. 5, the two parts 23a and 23b of the transformer could be combined into a single transformer 23 having a single first winding as shown in FIG. 3.

The transformer arrangement shown in FIG. 3 is preferred over that of FIG. 5, because the latter arrangement contributes additional d.c. resistance to the subscriber loop including the line 12. However, the arrangement of FIG. 5 can be used if the additional d.c. resistance in the subscriber loop provided by the second windings 25 is acceptable.

By way of example, it is observed that the components 28 and 29 may have magnitudes of 2.83mH and 18nF respectively for the transmit center frequency of 22kHz, and magnitudes of 4.6mH and 4.12nF respectively for the transmit center frequency of 36kHz.

In order to provide secondary protection, against transients due to lightning and other causes, for circuitry coupled to the wire 31, the winding 24 of the transformer 23 may be coupled to the wire 31 via a low impedance (e.g. 47Ω) series resistor (not shown) and the wire may be coupled to circuit ground via series-connected oppositely-poled zener diodes. Primary protection is provided separately in known manner, for example by surge protectors (not shown) connected directly across the line 12.

Although the above description relates to the coupling of FSK data signals to and from the line 12 via the inductors 26 and 27 as well as the transformer 23, the invention is not liimited thereto. Other narrow band carrier type data signals may be coupled in the same manner. Alternatively, wider band data signals may be coupled in a similar or different manner, depending in particular upon the signal bandwidth to be accommodated.

Thus relatively wide band data signals can be coupled via the series inductor 26, for example, to be coupled to the line 12. In this case the inductor 26 may be tuned to series resonate with the capacitor 22 as already described at, for example, a center frequency of the data signals, the resonant circuit being designed to have a relatively small Q factor to accommodate the relatively wide band. Compensation for the different coupling efficiencies to the line 12 across the band can be provided separately, for example by filtering circuitry coupled to the wire 32. Alternatively, such wide band data signals could be coupled via a plurality of inductors instead of the single series inductor 26, each of the inductors being series resonant with the capacitor 22 at a respective frequency within the data signal band to provide efficient coupling throughout this band.

As a further alternative, the series inductors 26 and 27 could be dispensed with altogether to enable wide band data signals to be coupled to and from the line, the resultant losses due to the shunt capacitor 22 being accommodated or compensated for by other means.

In addition, the invention is not limited to the provision of the parallel resonant circuit 28, 29, as described above, coupled in parallel with the winding 24. On the contrary any means, providing a relatively low impedance at frequencies in the pass band of the filter (e.g. the voice-band) to avoid degradation of the filter characteristics in the pass band, and providing a relatively high impedance to the signals to be coupled between the wire 31 and the line 12, may be coupled in parallel with the winding 24 in place of the specific parallel resonant circuit described. In fact it should be appreciated that the parallel resonant circuit described constitutes a low pass filter connected in parallel with the winding 24, and any other suitable form of low pass filter could be used in its place.

Numerous other modifications, variations, and adaptations may be made to the particular embodiments of the invention described above without departing from the scope of the invention as defined in the claims.

What is claimed is:

1. Apparatus comprising:
    a transformer having at least one first winding and at least one second winding;
    a filter having a predetermined pass band for coupling signals in the pass band to or from a two-wire line, the filter including a shunt capacitor coupled in series with the at least one second winding across the two-wire line; and
    means, coupled in parallel with the at least one first winding, having a relatively low impedance at frequencies in the pass band and a relatively high impedance at frequencies outside the pass band of the filter;
    whereby signals at said frequencies outside the pass band of the filter can be coupled to or from the two-wire line via the transformer.

2. Apparatus as claimed in claim 1 wherein the transformer comprises two second windings connected in series with the capacitor, one on each side thereof, across the two-wire line.

3. Apparatus as claimed in claim 1 wherein the means coupled in parallel with the at least one first winding comprises a parallel resonant circuit which is resonant at a frequency outside the pass band of the filter.

4. Apparatus as claimed in claim 2 wherein the means coupled in parallel with the at least one first winding comprises a parallel resonant circuit which is resonant at a frequency outside the pass band of the filter.

5. Apparatus as claimed in claim 1 or 2 wherein the filter is a low-pass filter.

6. Apparatus as claimed in claim 3 or 4, wherein the filter is a low-pass filter.

7. Apparatus as claimed in claim 1 or 2 wherein the filter is a low-pass filter and the two-wire line comprises a telephone subscriber line.

8. Apparatus as claimed in claim 3 or 4 wherein the filter is a low-pass filter and the two-wire line comprises a telephone subscriber line.

* * * * *